United States Patent [19]
Morinaga et al.

[11] Patent Number: 4,488,103
[45] Date of Patent: Dec. 11, 1984

[54] MOTOR CONTROL METHOD AND CONTROL APPARATUS THEREFOR

[75] Inventors: Shigeki Morinaga, Hitachi; Yasuyuki Sugiura, Takahagi, both of Japan

[73] Assignee: Hitachi, Ltd., Tokyo, Japan

[21] Appl. No.: 459,874

[22] PCT Filed: May 4, 1982

[86] PCT No.: PCT/JP82/00153
§ 371 Date: Dec. 28, 1982
§ 102(e) Date: Dec. 28, 1982

[87] PCT Pub. No.: WO82/03953
PCT Pub. Date: Nov. 11, 1982

[30] Foreign Application Priority Data

May 6, 1981 [JP] Japan .................................. 56-66868

[51] Int. Cl.³ ............................................... H02P 5/40
[52] U.S. Cl. ...................................... 318/811; 364/174
[58] Field of Search ................ 318/811, 594; 364/174, 364/167, 182

[56] References Cited

U.S. PATENT DOCUMENTS 4,118,771 10/1978 Pomella et al. ...................... 318/474
4,262,336 4/1981 Pritchard ............................ 364/174
4,290,001 9/1981 Espelang ............................. 318/811
4,346,434 8/1982 Moringa .............................. 364/174

Primary Examiner—David Smith, Jr.
Attorney, Agent, or Firm—Antonelli, Terry & Wands

[57] ABSTRACT

This invention relates to a motor control method and a control apparatus therefor in which an electric motor driven by a pulse width modulation inverter is digitally controlled by a digital arithmetic and logic circuit. Register file means including reference register groups, instantaneous register groups, comparison circuits and comparison output latch groups controlled in a time division mode by a stage signal is composed of a plurality of register files and the number of processing frequencies in response to the stage signal is increased, so that the motor can be controlled by a pulse width modulation signal having a fundamental wave frequency ensuring a higher resolution.

3 Claims, 19 Drawing Figures

MOTOR CONTROL METHOD AND CONTROL APPARATUS THEREFOR

TECHNICAL FIELD

This invention relates to a motor control method and a control apparatus therefor, and more particularly to a motor control method and a motor control apparatus in which an electric motor driven by a pulse width modulation inverter is digitally controlled by a digital arithmetic and logic circuit.

BACKGROUND ART

Microcomputers have been increasingly used in recent years for the variable speed control of electric motors. However, when individual control circuits constructed for independently controlling respective control objects of an electric motor are controlled together by a microcomputer, the individual control circuits have almost no organic linkage therebetween. As a known example dealing with such a drawback, there is Japanese patent application No. 39254/79.

That is, in this known example, input information indicative of an operating state of an electric motor is digitally, arithmetically and logically processed, and a plurality of reference register groups are provided so that they can individually hold the processed data classified depending on the respective contents of processing. The data held in the reference register groups provide the reference values used in a comparing operation.

There are further provided a plurality of instantaneous register groups holding data indicative of instantaneous states of the motor and others.

And, the reference register groups, the instantaneous register groups, an incrementer/decrementer for incrementing or decrementing the data by unity (1) or decrementing the data to zero, and a comparison circuit, are controlled in a time division mode for the control of the motor.

The stage processing for the control in the time division mode is allotted by outputs $C_0$ to $C_4$ a counter called a stage counter, as shown in Table 1. The allotted stage signals are as follows:

(1) PWM-P is used for processing for generating a carrier.
(2) PN-P is used for processing for counting the number of pulses subjected to pulse width modulation.
(3) UTM-P, VTM-P and WTM-P are used for processing for generating pulse width modulation signals of U-phase, V-phase and W-phase respectively.
(4) PULS-P is used for processing for counting external pulses.
(5) PULSW-P is used for processing for generating a constant period of time during which the external pulses are counted.

TABLE 1

| Stage signal | Stage counter | | | | |
|---|---|---|---|---|---|
| | $C_4$ | $C_3$ | $C_2$ | $C_1$ | $C_0$ |
| PWM-P | x | x | 0 | 0 | 0 |
| PN-P | x | x | 0 | 0 | 1 |
| UTM-P | x | x | 0 | 1 | 1 |
| VTM-P | x | x | 1 | 0 | 0 |
| WTM-P | x | x | 1 | 0 | 1 |
| PULS-P | x | x | 1 | 1 | 0 |
| PULSW-P | 0 | 0 | 0 | 1 | 0 |

The symbol x in Table 1 maybe a "0" or a "1".

However, many processing as shown in Table 1 results in a reduced frequency of processing for each individual control.

The prior art method of generating the period of time T of the carrier providing the fundamental frequency of pulse width modulation is as shown in (a) of FIG. 1.

That is, the data held in the carrier timer included in the instantaneous register groups and the data held in the P1 REG included in the reference register groups and holding data corresponding to the period of time T are compared to generate the period of time T. When the carrier timer is processed according to Table 1, the frequency is controlled in each of the 8 processing stages (the processing frequency) and determined. The frequency $f_0$ of the fundamental wave of pulse width modulation is expressed by the following equation:

$$f_0 = [\, 4 \times \text{(number of pulses in half cycle)} \times \text{(data of P1 REG)} \times \text{(processing frequency)} \times \text{(processing stage duration)} \,]^{-1}$$

Suppose, for example, that the processing frequency is 8 processing stages as shown in Table 1, the processing stage duration is 1 $\mu$s, and the number of pulses is 3. Then, when the data of the P1 REG is changed from "87" to "86", the frequency of the fundamental wave changes from 119.73 Hz to 121.12 Hz, and the prior art example is defective in that the resolution in that case is 1.2 % or becomes poorer.

DISCLOSURE OF INVENTION

The present invention deals with a prior art problem as described above so as to obviate such a defect, and has for its object to provide a motor control method and an apparatus therefor which contemplate to improve the resolution of the frequency of the fundamental wave of the pulse width modulation signal.

The motor control method according to the present invention which controls an electric motor by a pulse width modulation signal generated from a register file including reference register groups holding reference data, instantaneous register groups holding instantaneous data of the motor, and comparison circuits, is featured by the fact that the register file is divided into a register file processing the carrier timer and a register file processing generation of the pulse width modulation signal, thereby to control the motor.

The motor control apparatus according to the present invention is featured by the fact that it comprises a first comparison circuit comparing data held in individual registers selected from a first and a second reference register group and from a first and a second instantaneous register group sensing instantaneous states of an electric motor and holding the sensed signals, and a second comparison circuit comparing data held in individual registers selected from the second reference register group and the second instantaneous register group, the apparatus further comprising an auxiliary register provided for transfer of the data.

Describing in further detail, the present invention increases the number of the processing frequency as shown in (b) of FIG. 1 to improve the resolution of the frequency of the fundamental wave of the pulse width modulation signal, so that the data of the P1 REG can be increased for generating the same period of time T thereby improving the resolution. To this end, there are provided two register files including reference register groups, instantaneous register groups, an incrementer/- decrementer and comparison circuits. One of the register files generates the fundamental wave of pulse width modulation, while the other register file generates the pulse width modulation signals of individual phases and counts external pulses, and an auxiliary register is provided for transfer of the data between the two register files.

BEST MODE FOR CARRYING OUT THE INVENTION

An embodiment of the motor control method according to the present invention will now be described, together with an embodiment of the motor control apparatus, with reference to the drawings.

Figure 1:
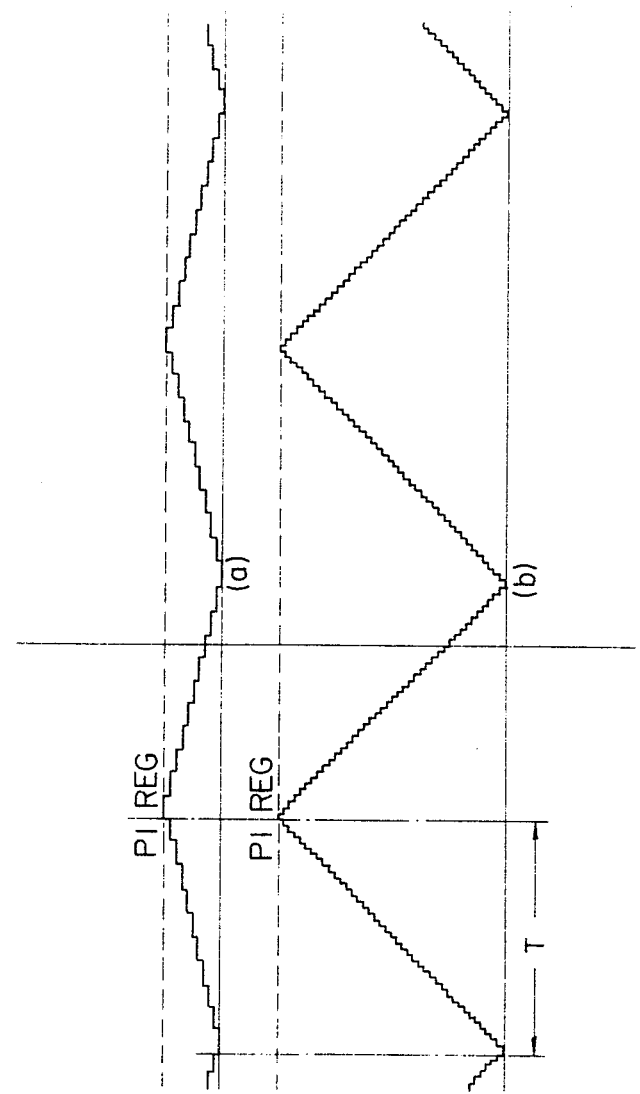
FIG. 1 is a comparative explanatory diagram illustrating the manner of generation of the carrier in the prior art and the present invention.
Figure 2:
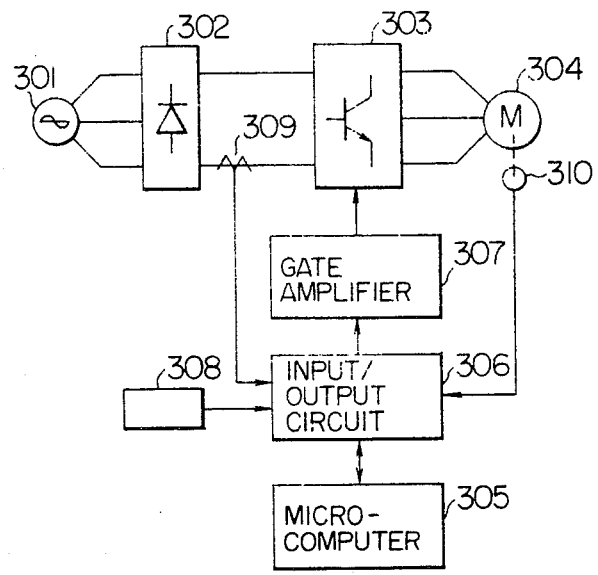
FIG. 2 is a block diagram of an embodiment of the apparatus according to the present invention used for the variable speed control of an electric motor.

First, FIG. 2 is a block diagram of an embodiment of the apparatus according to the present invention used for the variable speed control of an electric motor, that is, a block diagram illustrating how the motor is operated at a variable frequency.

In FIG. 2, 301 designates a commercial power source, 302 a rectifier circuit, 303 an inverter circuit, 304 an electric motor, 305 a microcomputer, 306 an input/output circuit, 307 a gate amplifier, 308 a frequency command, 309 a current sensor, and 310 a pulse generator.

Referring to FIG. 2, the a.c. voltage of the commercial power source 301 is rectified into a d.c. voltage by the rectifier circuit 302. The inverter circuit 303 converts the rectified d.c. voltage into an a.c. voltage of any desired variable frequency to supply power to the motor 304. A control command computed by the microcomputer 305 is applied as a quickly processed pulse width modulation inverter signal to the gate amplifier 307 from the input/output circuit 306. In response to the output signal from the gate amplifier 307, the inverter circuit 303 produces the a.c. voltage of variable frequency. The input/output circuit 306 receives information data indicative of the external status from the frequency command 308 determining the frequency of the a.c. voltage of the inverter circuit 303, the current sensor 309 sensing the motor current, and the pulse generator 310 coupled directly to the motor 304. On the basis of this information data, the microcomputer 305 effects arithmetic and logical processing to provide command data which is written in the input/output circuit 306, so that the pulse width modulation inverter signal is generated as commanded.

The rectifier circuit 302 is constituted by a diode bridge.

Figure 3:
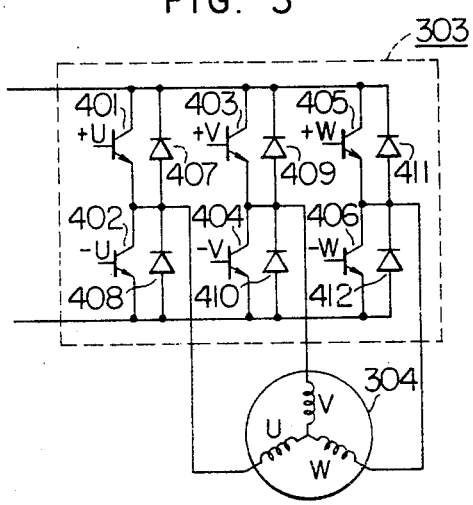
FIG. 3 shows the structure of the inverter circuit in the apparatus.

FIG. 3 is a circuit diagram showing the structure of the inverter circuit 303.

Referring to FIG. 3, 401 to 406 designate transistors (which may be replaced by, for example, gate turn-off thyristors) functioning as power elements, and the signals applied to the bases of these transistors 401 to 406 are designated by +U, −U, +V, −V, +W and −W respectively. Further, 407 to 412 designate return-current diodes.

Figure 4:
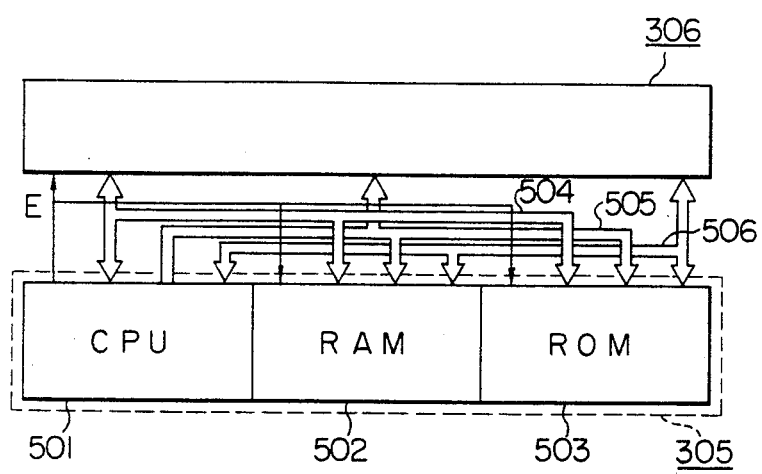
FIG. 4 shows the structure of the control circuit for the inverter.

FIG. 4 shows the structure of the inverter control circuit and is a connection diagram between the microcomputer 305, which is the control circuit, and the input/output circuit 306. The microcomputer 305 is composed of a CPU (central processor) 501, an RAM (random access memory) 502 and an ROM (read-only memory) 503. Information data and command data are conducted by way of a data bus 504, memory addresses are assigned by way of an address bus 505, and an interrupt request signal and read/write are conducted by way of a control bus 506. A clock signal generated from the CPU 501 is used for synchronization of the input/output circuit 306, RAM 502 and ROM 503.

Figure 5:
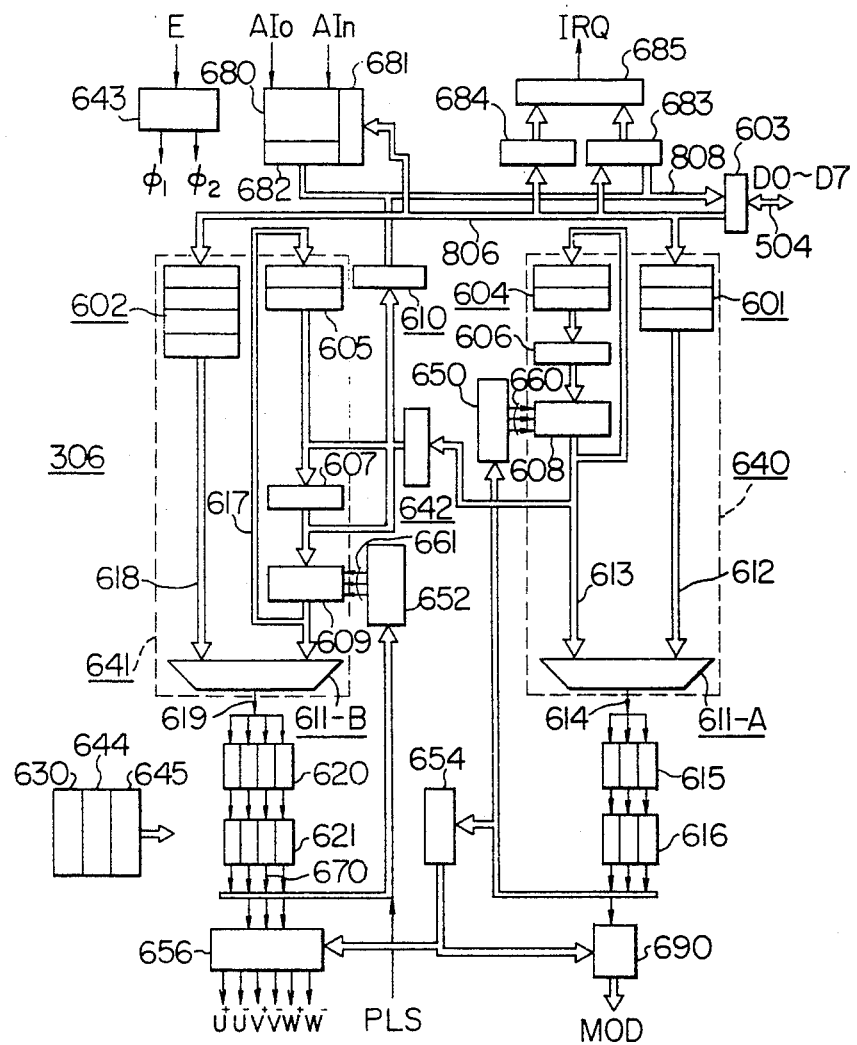
FIG. 5 shows the structure of the input/output circuit.

FIG. 5 shows the structure of the input/output circuit, that is, shows the practical circuit of the aforementioned input/output circuit 306.

Figure 7:
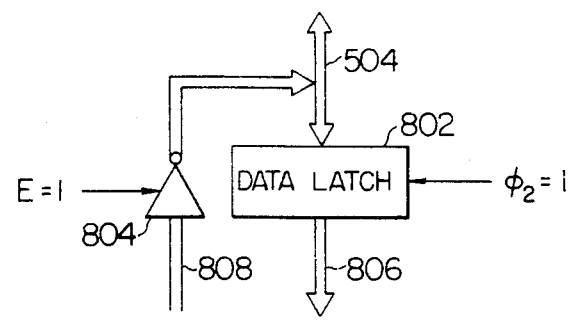
FIG. 7 is a circuit diagram of an interface circuit for the data bus.
Figure 8:
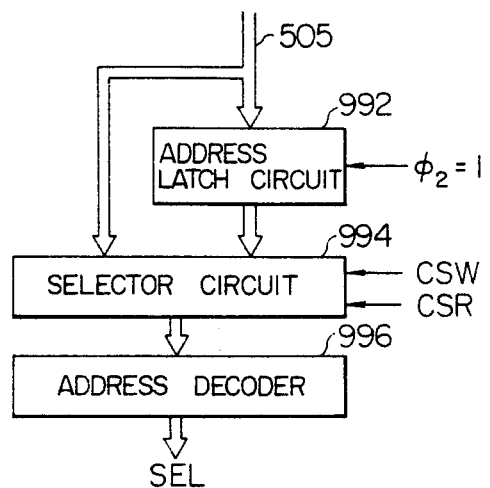
FIG. 8 is a circuit diagram of an interface circuit for the address bus.

Referring to FIG. 5, a register group 601 is a first reference register group for high speed, and another register group 602 is a second reference register group for low speed. These first and second reference register groups 601 and 602 hold data processed by the CPU 501. Such data is supplied from the CPU 501 through a data buffer 603. This data buffer 603 is composed of a data latch 802 and a read buffer 804 as shown in FIG. 7 which is a circuit diagram of an interface circuit for the data bus, and data is written in the reference register groups by way of a write bus 806. The individual registers in the first and second reference register groups 601 and 602 are assigned from the address bus 505 through an address decoder 996 as shown in FIG. 8 which is a circuit diagram of an interface circuit for the address bus, and the data above described is supplied to be held in the assigned registers.

A register group 604 is a first instantaneous register group for high speed, and another register group 605 is a second instantaneous register group for low speed. These first and second instantaneous register groups 604 and 605 hold instantaneous states of the motor, etc. And, the combination of the first instantaneous register group 604, a first latch circuit 606 and an incrementer/decrementer 608 exhibits the function of a so-called up/down counter. Also, the combination of the second instantaneous register group 605, a second latch circuit 607 and an incrementer 609 exhibits the function of an up counter.

An output register group 610 includes a register which holds, for example, the rotation speed of the motor, and such data is obtained by reading out the data from an instantaneous register when a certain condition is satisfied. A related register is selected by a signal applied from the CPU 501 in FIG. 4 by way of the address bus 505 and control bus 506, and the data held in the output register group 610 is supplied from this register to the CPU 501 by way of a read bus 808 shown in FIG. 7.

A first comparison circuit 611-A makes its comparing operation when a reference data from a register selected from those in the first reference register group 601 and instantaneous data from a register selected from those in the first instantaneous register group 604 are received at its input terminals 612 and 613 respectively. The result of comparison appears from its output terminal 614. The output terminal 614 is set in a predetermined latch in a first comparison output latch group 615 acting as a first comparison result holding circuit. Thereafter, it is set in a predetermined latch in a second comparison output latch group 616.

Also, a second comparison circuit 611-B makes its comparing operation when reference data from a register selected from those in the second reference register group 602 and instantaneous data from a register selected from those in the second instantaneous register group 605 are received at its input terminals 617 and 618 respectively. The result of comparison appears from its output terminal 619. The output terminal 619 is set in a predetermined latch in a third comparison output latch groups 620 acting as a second comparison result holding circuit. Thereafter, it is set in a predetermined latch in a fourth comparison output latch group 621.

The read/write operation for the first reference register group 601 and first instantaneous register group 604, the operation of the incrementer/decrementer 608 and first comparison circuit 611-A, and the output setting operation for the first comparison output latch group 615 and second comparison output latch group 616 are processed within a predetermined period of time. Also, the read/write operation for the second reference register group 602, second instantaneous register group 605 and output register group 610, the operation of the incrementer 609 and second comparison circuit 611-B, and the output setting operation for the third comparison output latch group 620 and fourth comparison output latch group 621 are processed within a predetermined period of time, as in the above case.

Various kinds of processing are executed in a time division mode according to the order of the stages of a stage counter 630. In each stage, respective predetermined registers in the first reference register group 601, second reference register group 602, first instantaneous register group 604, second instantaneous register group 605 and output register group 610, and respective predetermined latches in the first comparison output latch group 615 and third comparison output latch group 620, are selected.

The incrementer/decrementer 608 and the first comparison circuit 611-A are used in common to the individual registers in the first reference register group 601 and first instantaneous register group 604.

On the other hand, the incrementer 609 and the second comparison circuit 611-B are used in common to the individual registers in the second reference register group 602 and second instantaneous register group 605.

Herein, the combination of the first reference register group 601, first instantaneous register group 604, first latch circuit 606, incrementer/decrementer 608 and first comparison circuit 611-A is called a first register file 640, and the combination of the second reference register group 602, second instantaneous register group 605, output register group 610, second latch circuit 607, incrementer 609 and second comparison circuit 611-B is called a second register file 641.

High-speed processing is carried out by the first register file 640, and low-speed processing is carried out by the second register file 641.

An auxiliary register 642 is a register for storing temporarily the instantaneous data held in the first instantaneous register group in the first register file 640, and the data stored in this auxiliary register 642 is compared with the reference data held in the second register file 641. This auxiliary register 642 acts as means for data transfer between the first register file 640 and the second register file 641.

Figure 6:
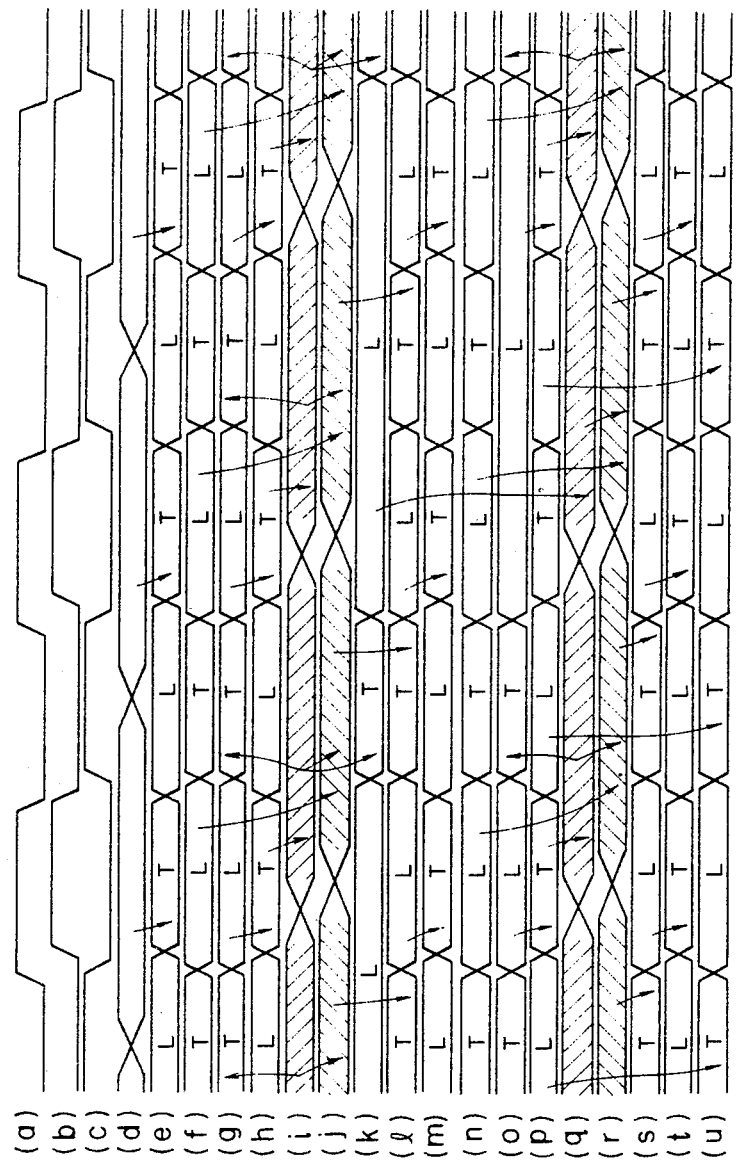
FIG. 6 is a timing chart of the input/output circuit.

FIG. 6 is a timing chart of the input/output circuit and illustrates the timing of the parts described with reference to FIG. 5.

That is, as shown in FIG. 4, an enable signal E is applied from the CPU 501 to the input/output circuit 306. This signal is shown in (a). This enable signal E is applied to a non-overlap circuit 643 which produces non-overlapping 2-phase clock signals $\phi_1$ and $\phi_2$. These signals are shown in (c) and (b).

The circuit shown in FIG. 5 operates with the clock signals $\phi_1$ and $\phi_2$.

FIG. 6 shows in (d) the output signal from the stage counter 630 shown in FIG. 5, and the stage is counted at the leading edge of the clock signal $\phi_1$. However, the output signal from the stage counter 630 builds up in a relation delayed from the leading edge of the clock signal $\phi_1$ due to a delay attributable to the wiring and gates.

The output signal (d) from the stage counter 630 is applied to a stage decoder 644 which generates a processing signal in each stage. However, since the stage processing signal is considerably delayed relative to the clock signal $\phi_1$, a stage latch 645 is provided. The output signal from the stage latch 645 is shown in (e).

In FIG. 6, "T" indicates that the latch circuits and register circuits are in the enable state, and this means that outputs from these circuits are dependent upon inputs thereto.

Further, "L" indicates that these circuits hold certain data, and this means that outputs from these circuits are not dependent upon inputs thereto.

The stage latch 645, which is placed in "T" in state response to the clock signal $\phi_2$ in (b) =1, holds the output signal from the stage decoder 644, and the output signal from this stage latch 645, shown in (e), represents the stage processing number STAGE. The stage signal (e) is changed over with the leading edge of the clock signal $\phi_2$, so that processing in each stage is executed in synchronism with the clock signal $\phi_2$. This stage signal shown in (e) provides a read signal applied to the first reference register group 601, first instantaneous register group 604, second reference register group 602 and second instantaneous register group 605, so that data is read out from selected predetermined registers.

FIG. 6 shows in (f) and (g) the operation of the first reference register group 601 and that of the first instantaneous register group 604 respectively. Reading from the registers in the first reference register group 601 and first instantaneous register group 604 is done by the aforementioned stage signal shown in (e). For writing, the first reference register group 601 and first instantaneous register group 604 are placed in state "T" in response to the clock signal $\phi_1$ in (c) = 1, so that writing is effected in synchronism with the clock signal $\phi_1$ shown in (c). Further, in the case of writing for the first reference register group 601, writing is applied to a register selected by the address signal SEL in FIG. 8 referred to already, and, in the case of writing for the first instantaneous register group 604, writing is applied to a register selected by the stage signal (e).

The operation of the first latch circuit 606 is shown in (h).

This circuit is placed in state "T" when the clock signal $\phi_2$ in (b) = 1, and the data held in the register selected by the stage signal (e) from those in the first instantaneous register group 604 is written therein. This circuit is placed in state "L" in response to the clock signal $\phi_2$ in (b) = 0. In this manner, the circuit 606 holds the data held in the predetermined register corresponding to the stage signal (e) among those of the first instantaneous register group 604. The data held in the first latch circuit 606 is modified depending on various conditions by the incrementer/decrementer 608 which is not synchronized with any one of the clock signals.

The incrementer/decrementer 608 exhibits functions as described below on the basis of a control signal 660 applied from an incrementer/decrementer controller 650.

That is, its first function is an increment/decrement function which increments or decrements by 1 the value indicated by an input data.

The second function is a non-increment/decrement function which permits passage of an input data intact without incrementing or decrementing the data.

Further, the third function is a reset function which changes all of input data into data indicative of zero value.

The flow of data in the individual registers in the first instantaneous register group 604 will be considered. One of the registers in the first instantaneous register group 604 is selected by the stage latch 645, and the data held therein is applied to the first comparison circuit 611-A through the first latch circuit 606 and incrementer/decrmenter 608. Then, a closed loop is formed, through which the output from the incrementer/decrementer 608 returns to the original selectd register. Therefore, when the incrementer/decrementer 608 exhibits the function of incrementing or decrementing the data by 1, the closed loop exhibits the function of an up/down counter.

However, when such a situation occurs in which, while data held in the first instantaneous register group 604 in this closed loop is appearing from a specific selected register, the data passes through the closed loop to be applied to the specific register, the counter function is lost resulting in malfunction. Therefore, the first latch circuit 606 is provided to cut such a data flow.

This first latch circuit 606 is placed in state "T" in response to the clock signal $\phi_2 = 1$. Since, on the other hand, the clock signal $\phi_1$ is $\phi_1 = 1$ in the state "T" in which input data is written in the register of the first instantaneous register group 604, the output from the first latch circuit 606 does not change even when the data held in the specific register in the first instantaneous register group 604 is changed. It is (h) which shows the operation of the circuit 606, as described already.

That is, the data flow is cut in response to $\phi_2 = 0$. Further, due to the delay attributable to the wiring and gates, the output data (i) from the incrementer/decrementer 608, which is not synchronized with the clock signals, is established in the illustrated hatched portion.

Like the incrementer/decrementer 608, the first comparison circuit 611-A operates also without being synchronized with the clock signals. The inputs to the first comparison circuit 611-A are the reference data applied from one of the registers selected by the stage signal (e) from the first reference register group 601 and applied through the first latch circuit 606 and incrementer/decrementer 608. The result of comparison of these two data is set in the latch selected by the stage signal (e) from those of the first comparison output latch group 615 placed in state "T" in response to the clock signal $\phi_1 = 1$.

The comparison result output signal 614 from the first comparison circuit 611-A at that time is shown in (j), and this signal is established in the illustrated hatched portion. Then, the output from the first comparison output latch group 615 is set in the second comparison output latch group 616 placed in state "T" in response to the clock signal $\phi_2 = 1$. The operation of these first and second comparison output latch groups 615 and 616 is shown in (l) and (m) respectively.

Also, not only the output from the incrementer/decrementer 608 returns to the first instantaneous register group 604, but also it is written in the auxiliary register 642 transferring data to the second register file 641. That operation is shown in (k).

The data from the auxiliary register 642 is treated to be the same as data from the second instantaneous register group 605 in the second register file 641.

The operation of the second register file 641 will be described.

The stage signal (e) provides also a read signal applied to the second reference register group 602 and second instantaneous register group 605, so that data is read out from selected predetermined registers. FIG. 6 shows in (n) and (o) the operation of the second reference register group 602 and second instantaneous register group 605, respectively. Reading from the second reference register group 602 and second instantaneous register group 605 is done by the stage signal (e). For writing, the second reference register group 602 and second instantaneous register group 605 are placed in state "T" in response to the clock signal $\phi_1 = 1$, so that writing is effected in synchronism with the clock signal $\phi_1$.

The operation of the second latch circuit 607 is shown in (p).

This circuit is placed in state "T" in response to the clock signal $\phi_2 = 1$, and data read out from a specific register among those of the second instantaneous register group 605 is written therein. This circuit is placed in state "L" in response to the clock signal $\phi_2 = 0$. In this manner, the circuit 607 holds the data held in the predetermined register corresponding to the stage signal among those of the second instantaneous register group 605. The data held in the second latch circuit 607 is modified depending on various conditions by the incrementer 609 which is not synchronized with the clock signals.

The incrementer 609 exhibits functions as described below on the basis of the output signal 661 from an incrementer controller 652.

The first function is an incrementer function which increments by 1 the value indicated by an input data. The second function is a non-increment function which permits passage of input data intact without incrementing the data. Further, the third function is a reset function which changes all of the input data into data indicative of a zero value.

The flow of data in the individual registers of the second instantaneous register group 605 will be considered. One of the registers in the second instantaneous register group 605 is selected by the stage signal (e), and the data held therein is applied to the second comparison circuit 611-B through the second latch circuit 607 and incrementer 609. Then, a closed loop is formed, through which the output from the incrementer 609 returns to the original selected register. Therefore, when the incrementer 609 exhibits the function of incrementing the data by 1, this closed loop exhibits the function of an up counter. However, when such a situation occurs in which, while data held in the second instantaneous register group 605 in this closed loop is appearing from a specific selected register, the data passes through the closed loop to be applied to the specific register, the counter function is lost resulting in malfunction. Therefore, the second latch circuit 607 is provided to cut such a data flow.

This second latch circuit 607 is placed in state "T" in response to the clock signal $\phi_2=1$. Since, on the other hand, the clock signal $\phi_1$ is $\phi_1=1$ in the state "T" in which input data is written in the registers of the second instantaneous register group 605, the output from the second latch circuit 607 does not change even when the data held in the specific register in the second instantaneous register group 605 is changed. It is (p) which shows the operation of the circuit 607.

That is, the data flow is cut in response to $\phi_2=0$. Further, due to the delay attributable to the wiring and gates, the output data (p) from the incrementer 609, which is not synchronized with the clock signals, is established in the illustrated hatched portion.

Like the incrementer 609, the second comparison circuit 611-B operates also without being synchronous with the clock signals. The inputs to the second comparison circuit 611-B are the reference data applied from one of the registers selected by the stage signal (e) from the second reference register group 602 and the instantaneous data appearing from one of the registers selected by the stage signal (e) from the second instantaneous register group 605 and applied through the second latch circuit 607 and incrementer 609. The result of comparison of these two data is set in the latch selected by the stage signal (e) from those of the third comparison output latch group 620 placed in state "T" in response to the clock signal $\phi_1=1$.

The comparison result output signal from the second comparison circuit 611-B at that time is shown in (r), and this signal is established in the illustrated hatched portion. Then, the output from the third comparison output latch group 620 is set in the fourth comparison output latch group 621 placed in state "T" in response to the clock signal $\phi_2=1$. The operation of these third and fourth comparison output latch groups 620 and 21 is shown in (s) and (t) respectively.

Further, the auxiliary register 642 and the second instantaneous register group 605 provide instantaneous data held in the second register file 641. It is (k) which shows the operating timing of this auxiliary register 642.

Since the input to the auxiliary register 642 is the output from the first register file 640, and the output is used in the second register file 641, there is a restriction in the timing. The auxiliary register 642 is placed in the state "T" in response to $\phi_1=1$. Since input data is applied to the auxiliary register 642 when the clock signal $\phi_1$ is $\phi_1=1$, its output data is not established until the clock signal $\phi_1$ turns into $\phi_1=0$. Therefore, the output cannot be used as data when the auxiliary register 642 is in the state "T". The output can be used as data when the auxiliary register 642 is placed in the state "L".

In response to the application of the output 670 from the fourth comparison output latch group 621 and the output from a fundamental wave generating circuit 654, an output control circuit 656 produces pulse width modulation signals U+, U−, V+, V−, W+ and W− providing gate signals of individual phases.

The fundamental wave generating circuit 654 generates the fundamental wave of the pulse width modulation signals on the basis of the output signal from the second comparison output latch group 616.

The incrementer/decrementer controller 650 is controlled by the output signal from the second comparison output latch group 616. Also, the incrementer controller 652 is controlled by the output signal from the fourth comparison output latch group 621 and by external pulses PLS.

The output signal from the fourth comparison output latch group 621 provides also a transfer signal used for writing from the second instantaneous register group 605 into the output register group 610.

The operation of the output register group 610 is shown in (u).

The output register selected by the stage signal (e) from the output register group 610 is placed in state "T" response to the clock signal $\phi_1=1$, and the instantaneous data held in the instantaneous register selected by the stage signal (e) from the second instantaneous register group 605 is written in the selected output register, and this register is placed in state "L" in response to the clock signal $\phi_1=0$.

In reading the data held in the output register group 610 by the CPU 501, the CPU 501 reads the data through the read bus 808.

In the case of the interface between the input/output circuit 306 and the CPU 501 shown in FIG. 4 (when, for example, a CPU of model HD 46800 made by Hitachi, Ltd. is used as this CPU 501), the timing of writing data from the CPU 501 into the first and second reference register groups 601 and 602 is different from the timing of reading out data from the output register group 610 to the CPU 501, according to the timing chart of FIG. 6.

FIGS. 7 and 8 are block representations of the interface circuits for data and addresses.

As described already, FIG. 7 is a circuit diagram of the interface circuit for the data bus, and FIG. 8 is a circuit diagram of the interface circuit for the address bus.

Referring first to FIG. 7, the write bus 806 for writing from the CPU 501 is held by the write latch circuit 802 which is placed in state "T" in response to the clock signal $\phi_2=1$, and, in response to the clock signal $\phi_1=1$, data is written in a reference register selected by an address signal applied to the first and second reference register groups 601 and 606.

Read data read out to the CPU 501 is fed out to the data bus 504 through the read bus 808 and through the tri-state buffer circuit 804 placed in its enable state in response to the enable signal E=1 from the CPU 501, to be supplied to the CPU 501.

Further, the first and second reference register groups 601, 602 and the output register group 610 are selected by the address signal applied from the CPU 501. FIG. 8 shows such a register selection circuit.

That is, the timing of the register selection signal SEL for the first and second reference register groups 601 and 602 is different from that for the output register group 610, as in the case of data.

The address signal is held in an address latch circuit 992 placed in state "T" in response to $\phi_2 1$, and, depending on whether the data is write data or read data, the output signal from the address latch circuit 992 or the address signal on the address bus 505 is selected by a chip select write signal CSW or a chip select read signal CSR produced by the signal applied through the control bus. In the case of the signal CSW, the output signal from the address latch circuit 992 is selected by a selection circuit 994, while, in the case of the signal CSR, the address signal is selected. The signal selected by the selection circuit 994 is applied to the address decoder 996 to provide the register selection signal SEL used for selecting a register.

As described already with reference to FIG. 2, control elements (power elements) are used in the inverter. Therefore, the level of current supplied to the elements may pose a problem, or a current limitation may be necessary. Thus, the input/output circuit 306 includes an A/D converter 680 as shown in FIG. 5 so as to convert an analog quantity into a digital quantity. Other analog quantities required for the control of the motor include the d.c. voltage and speed command.

The A/D converter 680 shown in FIG. 5 is provided with a multiplexer, and digital data obtained by converting an analog quantity into a digital quantity is held in an analog register 682 to be supplied to the CPU 501 as read data for the CPU 501.

Further, the channel of the A/D converter 680 provided with the multiplexer is assigned by the output from a multiplexer register 681. There is applied to this multiplexer register 681 write data from the CPU 501.

The input/output circuit 306 includes a status register 683 applying an interrupt request signal to the CPU 501 and a mask register 684 for masking the interrupt request signal. The status register 683 holds the internal status of the input/output circuit 306.

Its contents are shown in Table 2.

TABLE 2

| Bit | Contents |
|---|---|
| Bit 0 | Edge signal of the external pulse PLS |
| Bit 1 | Edge signal of the fundamental wave of pulse width modulation |
| Bit 2 | Conversion completion signal of the A/D converter 680 provided with the multiplexer |

Figure 9:
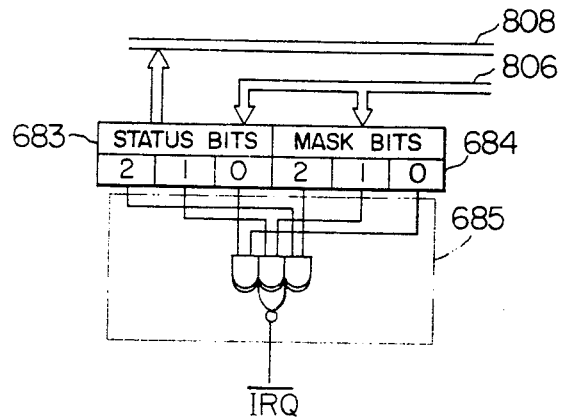
FIG. 9 is a circuit diagram of the interrupt control circuit.

FIG. 9 is an interrupt control circuit diagram which shows an interrupt control circuit 685 together with the status register 683 and mask register 684.

The status register 683 acts as a read register for the CPU 501 so as to analyze the factor of interrupt by the CPU 501. Also, the mask register 684 acts as a write register to be assigned from the CPU 501. The individual bits of the output signals from the status register 683 and mask register 684 are subjected to the AND-OR-NOT logic, and the output signal provides the interrupt request signal $\overline{IRQ}$.

Figure 10:
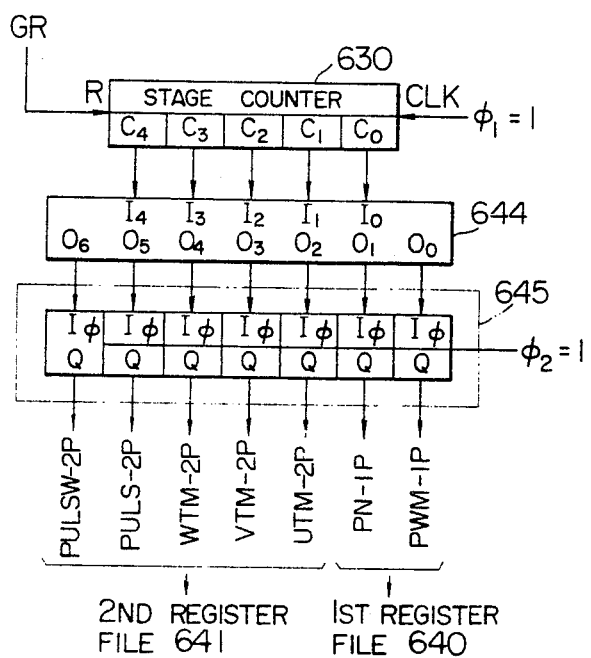
FIG. 10 is a circuit diagram of the stage signal generating circuit.

Next, FIG. 10 shows the stage signal generating circuit generating the stage signal (e) referred to already.

More precisely, the stage counter 630 starts counting in response to the clock signal $\phi_1=1$ applied from the non-overlap circuit 643 shown in FIG. 5, and the output from the stage counter 630 is applied as an input to the stage decoder 644. The stage decoder 644 generates signals $O_0$ to $O_6$ as its output. These output signals $O_0$ to $O_6$ are applied to the stage latch circuit 645, and this stage latch circuit 645 is placed in state "T" in response to the clock signal $\phi_2=1$ to hold the output signals $O_0$ to $O_6$ from the stage decoder 644.

The stage decoder 644 above described can be easily realized by use of a read-only memory or the like and may also be of the microprogramming type.

The stage signals which are the output from the stage latch circuit 645 are divided into a group applied to the first register file 640 and a group applied to the second register file 641.

Details of stage processing are as shown in Table 3.

TABLE 3

| Stage signal | Details of processing |
|---|---|
| PWM-1P | Processing for producing the carrier |
| PN-1P | Processing for controlling the number of pulses of pulse width modulation |
| UTM-2P | Processing for determining the pulse width modulation of the U-phase of the Motor by the carrier |
| VTM-2P | Processing for determining the pulse width modulation of the V-phase of the motor by the carrier |
| WTM-2P | Processing for determining the pulse width modulation of the W-phase of the motor by the carrier |
| PULS-2P | Processing for counting the number of external pulses PLS within a certain period of time |
| PULSW-2P | Processing for determining the time period for PULS-2P |

The relation between the stage signals and the output from the stage counter 630 is as shown in Table 4.

TABLE 4

| Stage signal | Stage counter | | | | |
|---|---|---|---|---|---|
|  | $C_4$ | $C_3$ | $C_2$ | $C_1$ | $C_0$ |
| PWM-1P | x | x | x | x | 0 |
| PN-1P | x | x | x | x | 1 |
| UTM-2P | x | x | 0 | 0 | 1 |
| VTM-2P | x | x | 0 | 1 | 1 |
| WTM-2P | x | x | 1 | 0 | 1 |
| PULS-2P | x | x | 0 | 0 | 0 |
| PULSW-2P | 0 | 0 | 0 | 0 | 0 |

In Table 4, -1P indicates those signals applied to the first register file, and -2P indicates those signals applied to the second register file.

First, a general reset signal GR is applied to the reset terminal of the stage counter 630 in FIG. 10, so that all of the counter output signals $C_0$ to $C_4$ become zero.

This general reset signal GR is applied from the CPU 501 in the starting stage of this control circuit.

Under the above condition, the counter output signals $C_0$ to $C_4$ from the stage counter 630 are O's. When the clock signal $\phi_2 = 1$ indicated by CLK is then applied, the output signals appearing from the stage latch circuit 645 in response to the leading edge of the clock signal $\phi_2$ are PWM-1P applied to the first register file 640 and PULSW-2P applied to the second register file 641. In response to these stage signals, the PWM processing and PULSW processing are carried out.

Then, in response to the clock signal $\phi_1 = 1$, the stage counter 630 counts 1. Then, in response to the leading edge of the clock signal $\phi_2$, the stage signal PN-1P is applied to the first register file 640, and the stage signal UTM-2P is applied to the second register file 641. In response to those stage signals, the PN processing and UTM processing are carried out.

In this manner, the stage counter 630 continues counting in response to the clock signal $\phi_1 = 1$, and the stage signals are generated in the order shown in Table 3 in response to the leading edge of the clock signal $\phi_2$, so that the individual kinds of processing are carried out in response to these signals. The processing shown in Table 3 is repeated in the manner above described.

Figure 11:
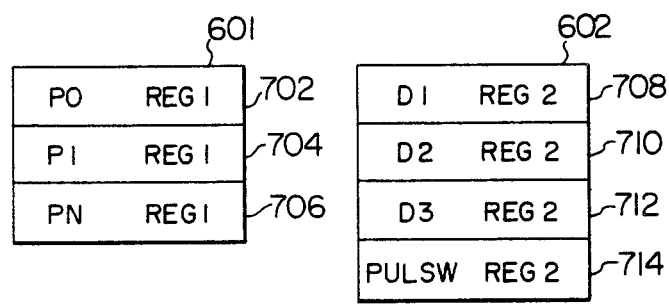
FIG. 11 shows the arrangement of the reference register groups.

Table 5 shows the detailed contents of the first reference register group 601 and second reference register group 602 holding the reference data corresponding to the individual pulse outputs obtained as a result of arithmetic and logical processing of input data including those of the motor by the CPU 501. FIG. 11 shows the arrangement thereof.

More precisely, FIG. 11 shows the arrangement of the registers in the reference register groups.

TABLE 5

| Register No. | Register function |
|---|---|
| 702 (P0 REG1) | This register holds the data indicative of the lower limit of the carrier for the PWM processing. |
| 704 (P1 REG1) | This register holds the data indicative of the upper limit of the carrier for the PWM processing. On the basis of this data and the data hold in the P0 REG1 702, the frequency of the carrier for the PWM processing is determined. |
| 706 (PN REG1) | This register holds the data indicative of the number of unequal pulses. |
| 708–712 (D1–D3 REG2) | These registers hold the data indicative of the half period of the modulating wave. These three data express the modulating wave. |
| 714 (PULSW REG2) | This register holds the data indicative of the fixed time period used for sensing the rotation speed of the motor. |

In Table 5,—REG1 indicates those registers included in the first reference register group, and—REG2 indicates those registers included in the second reference register group.

Figure 12:
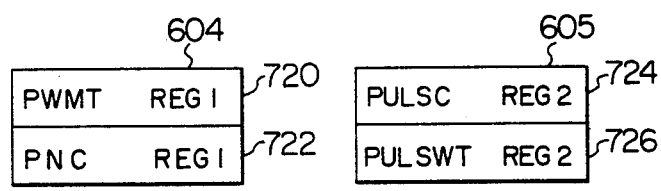
FIG. 12 shows the arrangement of the instantaneous register groups.

Table 6 shows the detailed contents of the first instantaneous register group 604 and second instantaneous register group 605 holding the instantaneous states of the motor and others and having the counter function, and their arrangement is shown in FIG. 12.

More precisely, FIG. 12 shows the arrangement of the registers included in the instantaneous register groups.

TABLE 6

| Register No. | Register function |
|---|---|
| 720 (PWMT REG1) | This register is used for generation of the carrier signal for the PWM processing. This register holds the instantaneous data incremented every 2 $\mu$s. |
| 722 (PNC REG1) | This register counts the output from a P0 BF1 914 in the second comparison output latch group providing the count input indicative of the number of pulses of the pulse width modulation signal and holds the instantaneous data incremented each time an output pulse appears from the P0 BF1. This register controls the number of pulses of pulse width modulation. |
| 724 (PULSC REG2) | This register holds the instantaneous data incremented each time an external pulse PLS appears after generation of an output pulse from a PULSW BF2 926 in the fourth comparison output latch group. |
| 726 (PULSWT REG2) | This register holds the instantaneous data incremented each time a predetermined period of time elapses after generation of an output pulse from the PULSW BF2 926 (FIG. 14) in the fourth comparison output latch group. The time period for sensing the rotation speed. |
| 642 (TEMP REG) | This register holds the instantaneous data of the carrier processed in the first register file 640. This register is an auxiliary register whose output is used as the instantaneous data in the second register file 641. |

In Table 6,—REG1 indicates those registers included in the first instantaneous register group 604, and—REG2 indicates those registers included in the second instantaneous register group 605.

Table 7 shows the detailed contents of the output register group 610 holding the measured data. Its arrangement is shown in FIG. 13.

Figure 13:
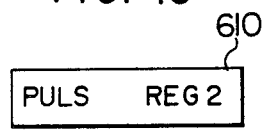
FIG. 13 shows the arrangement of the output register group.

That is, FIG. 13 shows the arrangement of the output register group.

TABLE 7

| Register No. | Register function |
|---|---|
| 610 (PULS REG2) | The data held in the PULS REG2 610 in the instantaneous register group is held after generation of an output pulse from the PULSW BF 926 in the fourth comparison output latch group. |

Figure 14:
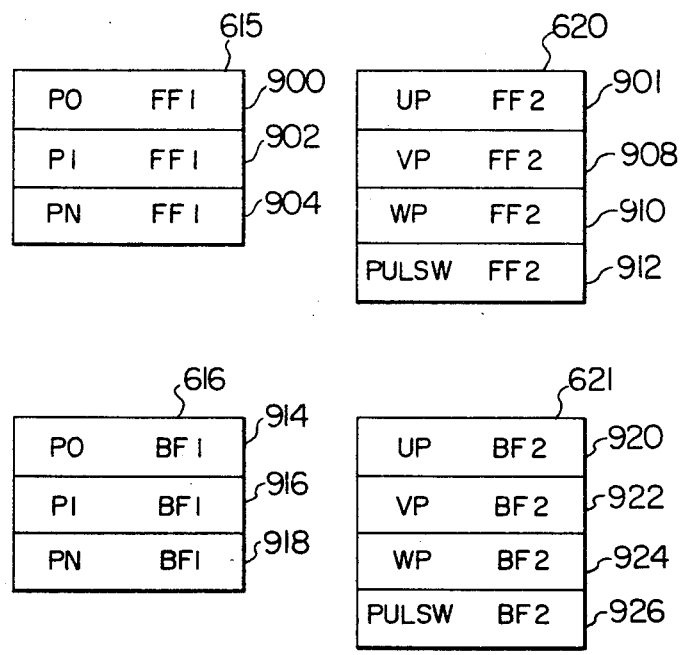
FIG. 14 shows the arrangement of the comparison output latch groups.

Table 8 shows the detailed contents of the first and third comparison output latch groups 615, 620 and the second and fourth comparison output latch groups 616, 621 holding the comparison outputs from the first and second comparison circuits 611-A and 611-B, and their arrangement is shown in FIG. 14.

More precisely, FIG. 14 shows the arrangement of registers constituting the comparison output register groups.

TABLE 8

| Latch No. | Latch function |
|---|---|
| 900 (P0 FF1) | A "1" is latched under the condition that the data held in the P0 REG1 702 in the first reference register group ≧ the data held in the PWMT REG1 720 in the first |

TABLE 8-continued

| Latch No. | Latch function |
|---|---|
| | instantaneous register group. |
| 920 (P1 FF1) | A "1" is latched under the condition that the data held in the P1 REG1 704 in the first reference register group $\leqq$ the data held in the PWMT REG1 720 in the first instantaneous register group. |
| 904 (PN FF1) | A "1" is latched under the condition that the data held in the PN REG1 706 in the first reference register group $\leqq$ the data held in the PNC REG1 722 in the first instantaneous register group. |
| 906 (UP FF2) | A "1" is latched under the condition that the data held in the $D_1$-$D_3$ REG2 708-712 in the second reference register group $\leqq$ the data held in the auxiliary register TEMP REG 642, thereby providing the pulse width modulation signal of U-phase. |
| 908 (VP FF2) | A "1" is latched under the condition that the data held in the $D_1$-$D_3$ REG 2 708-712 in the second reference register group $\leqq$ the data held in the auxiliary register TEMP REG 642, thereby providing the pulse width modulation signal of V-phase. |
| 910 (WP FF2) | A "1" is latched under the condition that the data held in the $D_1$-$D_3$ REG2 708-712 in the second reference register group $\leqq$ the data held in the auxiliary register TEMP REG 642, thereby providing the pulse width modulation signal of W-phase. |
| 912 (PULSW FF2) | A "1" is latched under the condition that the data held in the PULSW REG2 714 in the second reference register group $\leqq$ the data held in the PULSWT REG2 726 in the second instantaneous register group. |
| 914 (P0 BF1) | The output from the P0 FF1 900 in the first comparison output latch group is latched in response to the clock signal $\phi_2 = 1$. |
| 916 (P1 BF1) | The output from the P1 FF1 902 in the first comparison output latch group is latched in response to the clock signal $\phi_2 = 1$. |
| 918 (PN BF1) | The output from the PN FF1 904 in the first comparison output latch group is latched in response to the clock signal $\phi_2 = 1$. |
| 920 (UP BF2) | The output from the UP FF2 906 in the third comparison output latch group is latched in response to the clock signal $\phi_2 = 1$. |
| 922 (VP BF2) | The output from the VP FF2 908 in the third comparison output latch group is latched in response to the clock signal $\phi_2 = 1$. |
| 924 (WP BF2) | The output from the WP FF2 910 in the third comparison output latch group is latched in response to the clock signal $\phi_2 = 1$. |
| 926 (PULSW BF2) | The output from the PULSW FF2 912 in the third comparison output latch group is latched in response to the clock signal $\phi_2 = 1$. |

In Table 8,—FF1 indicates those latches included in the first comparison output latch group 615, —FF2 indicates those latches included in the third comparison output latch group, —BF1 indicates those latches included in the second comparison output latch group 616, and —BF2 indicates those latches included in the fourth comparison output latch group 621.

Figure 15:
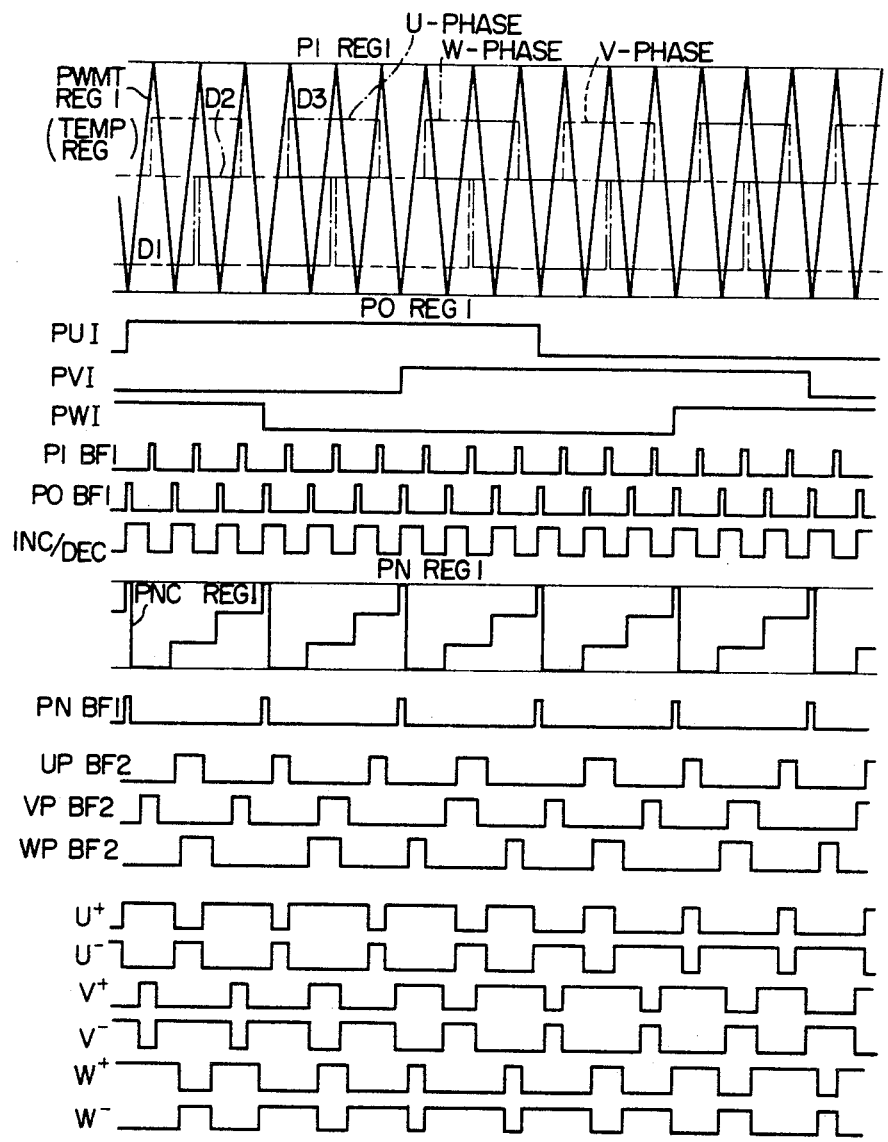
FIG. 15 shows the manner of generation of the pulse width modulation signal.

Next, FIG. 15 is a diagram explaining the manner of generation of the pulse width modulation signal and illustrates how to generate the pulse width modulation signal of unequal pulses applied to the inverter as the gate signal.

The carrier of the pulse width modulation signal is generated from the PWMT REG1 under processing in response to the stage signal PWM-1P.

This carrier is controlled by the PWMT REG1 720 in the first instantaneous register group 604 and by the P0 REG1 702 and P1 REG1 704 in the first reference register group 601.

Under processing in response to the stage signal PWM-1P, the PWMT REG1 720 is unconditionally incremented or decremented by the incrementer/decrementer 608. The increment or decrement operation is controlled by the P0 BF1 914 and P1 BF1 916 in the second comparison output latch group 616. When INC/DEC of the output from a flip-flop (not shown), which is set in response to P0 BF1=1 and reset in response to P1 BF1=1, is a "1", the PWMT REG1 720 is incremented, while, when INC/DEC is a "0", the PWMT REG1 720 is decremented.

When incremented, the PWMT REG1 720 is compared with the P1 REG1 704, and, when the condition that the data held in the PWMT REG1 720 is more than or equal to the reference data held in the P1 REG1 704 is satisfied, a "1" is latched in the P1 FF1 902 in the first comparison output latch group 615. Then, the P1 BF1 916 in the second comparison output latch group 616 latches the output from the P1 FF1 902, and the output from the P1 BF1 916 becomes a "1".

When decremented, the PWMT REG1 720 is compared with the P0 REG1 720, and, when the condition that the data held in the PWMT REG1 720 is less than or equal to the reference data held in the P0 REG1 702 is satisfied, a "1" is latched in the P0 FF1 900 in the first comparison output latch group 615. Then, the P0 BF1 914 in the second comparison output latch group 616 latches the output from the P0 FF1 900, and the output from the P0 BF1 914 becomes a "1".

As seen in FIG. 15, the data held in the PWMT REG1 720 changes with time.

Next, the control of the number of unequal pulses will be explained.

The number of pulses of the pulse width modulation signal is controlled by the PNC REG1 722 under processing in response to the PN-1P.

The PNC REG1 722 in the first instantaneous register group 604 is incremented when the P0 BF1 914 is a "1". The PNC REG1 722 is compared with the PN REG1 706 in the first reference register group 601, and, when the condition that the data held in the PNC REG1 722 is more than or equal to the reference data held in the PN REG1 706 is satisfied, a "1" is latched in the PN FF1 904 in the first comparison output latch group 615.

Then, the PN BF1 918 in the second comparison output latch group 616 latches the output from the PN FF1 904, and the PN BF1 918 becomes a "1". The PNC REG1 722 is reset when the output from the PN BF1 918 is a "1". The number of pulses is controlled by this PN BF1 918.

Figure 16:
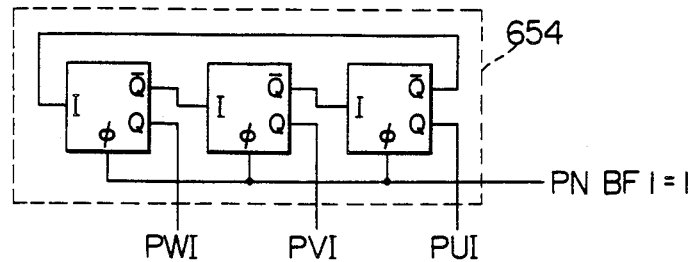
FIG. 16 is a circuit diagram of the fundamental wave generating circuit.

FIG. 16 is a fundamental wave generating circuit diagram and shows the circuit 654 shown in FIG. 5 which generates the fundamental wave of the pulse width modulation signal.

This fundamental wave generating circuit 654 is a 3-stage shift register in which a shift from stage to stage occurs in response to PN BF1=1, and the state of shift is shown by PUI, PVI and PWI in FIG. 16.

That is, PN BF1=1 is a signal of 60° in electrical angle.

Next, the pulse width modulation signals of unequal pulses applied to individual arms are obtained by processing in response to the stage signals UTM-2P, VTM-2P and WTM-2P shown in FIG. 10 referred to already. Since these processings are carried out in the second register file 641, the data in the PWMT REG1 720 holding the instantaneous data of the carrier cannot be used. (This is because the PWMT REG1 720 is present in the first register file 640.)

Therefore, the data held in the PWMT REG1 720 in the first register file 640 is also held in the auxiliary register TEMP REG 642, and the output data from the auxiliary register 642 is used in the second register file 641. Thus, the data of the carrier can be used in the second register file 641.

In the case of processing in response to the UTM-2P for generating the pulse width modulation signal of U-phase, the registers (D1 REG2 708, D2 REG2 710, D3 REG2 712) related to the modulating wave are selected by the output MOD from a modulating wave selection circuit 690 (FIG. 5).

Figure 17:
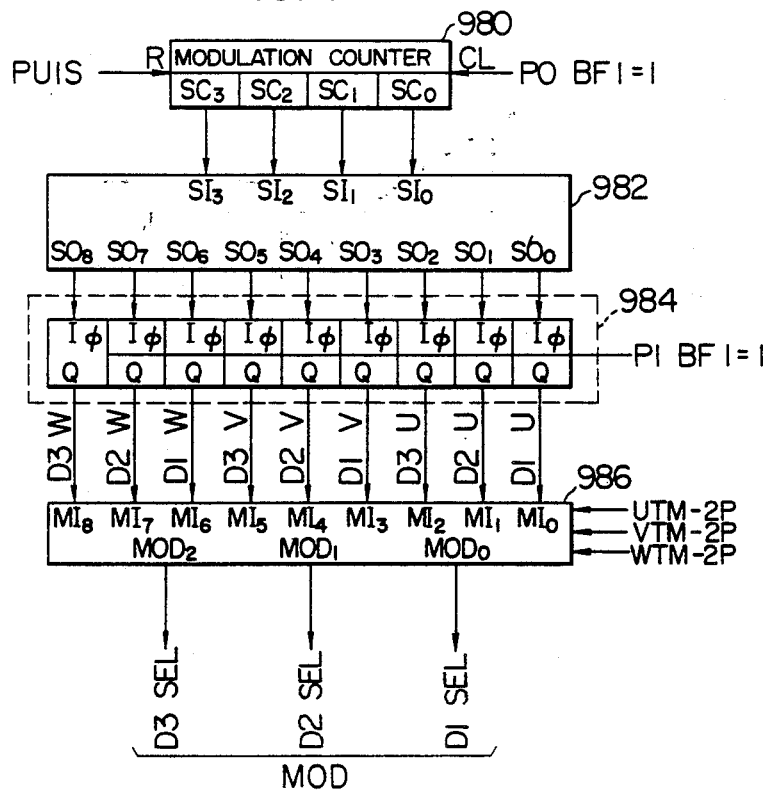
FIG. 17 is a circuit diagram of the modulating wave selection circuit.

FIG. 17 is a modulating wave selection circuit diagram showing the modulating wave selection circuit 690 above described.

First, a modulation counter 980 is provided for generating modulating waves of individual phases. This modulation counter 980 counts P0 BF1=1. Its output signals SC$_0$ to SC$_3$ are used to generate the modulating waves of individual phases. For this purpose, a modulating wave decoder 982 produces selection signals D1 U, D2 U, D3 U, D1 V, D2 V, D3 V, D1 W, D2 W and D3 W for the D$_1$ REG2 708, D$_2$ REG2 710 and D$_3$ REG2 712. Table 9 shows the detailed contents of the modulating wave decoder 982.

TABLE 9

| Phase | | | Modulation counter | | | | Selection signal | | |
|---|---|---|---|---|---|---|---|---|---|
| PUI | PVI | PWI | SC$_3$ | SC$_2$ | SC$_1$ | SC$_0$ | U-phase | V-phase | W-phase |
| 1 | 0 | 1 | 0 | 0 | 0 | 0 | D1 | D2 | D2 |
|  |  |  | 0 | 0 | 0 | 1 | D2 | D3 | D2 |
|  |  |  | 0 | 0 | 1 | 0 | D2 | D3 | D1 |
| 1 | 0 | 0 | 0 | 0 | 1 | 1 | D3 | D2 | D1 |
|  |  |  | 0 | 1 | 0 | 0 | D3 | D2 | D1 |
|  |  |  | 0 | 1 | 0 | 1 | D2 | D1 | D2 |
| 1 | 1 | 0 | 0 | 1 | 1 | 0 | D2 | D1 | D2 |
|  |  |  | 0 | 1 | 1 | 1 | D1 | D1 | D3 |
|  |  |  | 1 | 0 | 0 | 0 | D1 | D2 | D3 |

The output signals SC$_0$ to SC$_3$ from the modulating wave decoder 982 are held in a modulating wave latch 984 which is placed in state "T" in response to P1 BF1=1.

The output signals from the modulating wave latch 984 provide the modulating waves of individual phases shown in FIG. 5.

In response to the UTM-2P, VTM-2P and WTM-2P applied for individual phase processing, the D1 REG2 708, D2 REG2 710 and D3 REG2 712 are selected by the output MOD from a register selection circuit 986.

When, for example, the condition that the data held in the auxiliary register TEMP REG 642 is more than or equal to the reference data held in the U-phase modulating wave registers (D1 REG2 708, D2 REG2 710, D3 REG2 712) selected by the modulating wave selection circuit 690 is satisfied in the case of processing in response to the UTM-2P, a "1" is latched in the UP FF2 906 in the third comparison output latch group. Then, the UP BF2 920 in the fourth comparison output group latches the output from the UP FF2, and the output from the UP BF2 becomes a "1". In the above case, however, the result of comparison is held in the third comparison output latch group only when the carrier is even-numbered. Similar operation is also effected in the case of processing in response to the stage signals VTM-2P and WTM-2P.

The outputs from the UP BF2 920, VP BF2 922 and WP BF2 924 are applied to the output control circuit 656 to generate the pulse width modulation signals U+, U−, V+, V−, W+ and W−.

Figure 18:
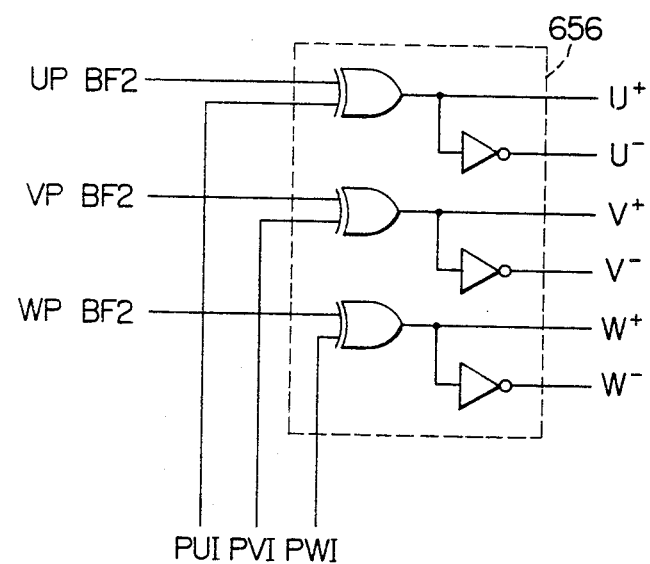
FIG. 18 is a circuit diagram of the output control circuit.

FIG. 18 is an output control circuit diagram showing the output control circuit 656.

The outputs from the UP BF2 920, VP BF2 922 and WP BF2 924 holding the results of comparison between the carrier and the modulating waves of individual phases, and the fundamental waves PUI, PVI and PWI of individual phases subjected to pulse width modulation are applied to exclusive-OR gates provided for the individual phases respectively, so that the outputs from the individual gates provide the pulse width modulation signals U+, V+ and W+ applied to the upper arm of the inverter. Also, the inverted equivalents of U+, V+ and W+ provide the pulse width modulation signals applied to the lower arm of the inverter.

Figure 19:
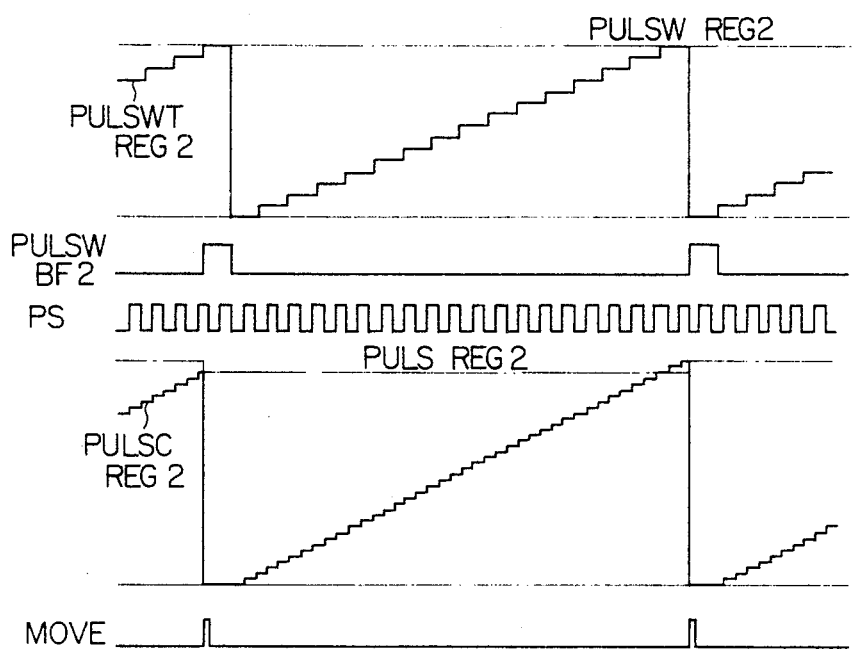
FIG. 19 is a diagram illustrating the rotation speed sensing function.

FIG. 19 explains the rotation speed sensing function to illustrate the rotation speed sensing function which is a function other than the function of pulse width modulation signal generation.

The rotation speed sensing function concerns the method and processing for counting a synchronous external pulse signal PS within a predetermined period of time.

The PULSWT REG2 726 in the second instantaneous register group 605 for generating the constant time period is unconditionally incremented in response to the stage signal PULSW-2P and is reset when a "1" is held in the PULSW BF2 926 in the fourth comparison output latch group 621. When the data held in the PULSWT REG2 726 in the second instantaneous register group 605 is compared with the reference data held in the PULSW REG2 714 in the second reference register group 602, and the condition that the data held in the PULSWT REG2 726 is more than or equal to the reference data held in the PULSW REG2 714 is satisfied, a "1" is latched in the PULSW FF2 912 in the third comparison output latch group 620. Then, the PULSW BF2 926 in the fourth comparison output latch group 621 latches the output from the PULSW FF2, and its output becomes a "1", so that a certain fixed time period can be obtained.

The data held in the PULSC REG2 724 in the second instantaneous register group 605, which counts the external pulse signal PS synchronized by processing in response to the stage signal PULS-2P (a signal obtained by synchronizing the external pulse signal PLS with the internal clock signal to indicate the leading and trailing edges), is transferred to the PULS REG2 610 in the output register group in response to the leading edge of the PULSW BF2 926 to write the data therein. That transfer signal is indicated by MOVE.

Next, the method for setting reference data in the first and second reference register groups 601 and 602 will be described.

For example, in order to generate the pulse width modulation signals shown in FIG. 3, the speed command is A/D converted in the input/output circuit 306, and the A/D converted data is applied to the CPU 501 in the microcomputer 305. On the basis of that data, the effective voltage to be supplied to the motor 304 and the number of unequal pulses relative to the frequency of the speed command are calculated by arithmetic processing or obtained from information stored in the form of a map. The data related to the frequency is set in the P0 REG1 702 and P1 REG1 704, and the data related to the number of pulses is set in the PN REG1 706 and in the D1 to D3 REG2 708 to 714 providing the modulating waves determining the effective voltage. When this data is set, the pulse width modulation signals are generated.

As described hereinbefore, according to the embodiment of the present invention, a register file including reference register groups, instantaneous register groups, comparison circuits and comparison output latch groups controlled in a time division mode by stage signals, is divided into a plurality of register files, and the number of processing frequencies in response to the stage signals is increased, so that the motor can be controlled by a pulse width modulation signal having a fundamental wave frequency ensuring a higher resolution.

In view of the above description, a motor control method and a motor control apparatus can be provided according to the present invention which obviates the prior art defects and improves the resolution of the fundamental frequency of the pulse width modulation signal thereby satisfactorily controlling the motor. Thus, the invention is prominent and capable of attaining excellent practical effects.

What is claimed is:

1. In a motor control system, including a pulse width modulation inverter for producing a multi-phase AC voltage by converting a DC voltage in response to a pulse width modulation signal to determine each phase of said multi-phase AC voltage, an apparatus for producing said pulse width modulation signal on the basis of comparison between a carrier wave and a modulating wave determined by a computer according to a desired speed of the AC motor, comprising:

clock signal generating means for producing a clock signal;

first register file means, periodically operating in response to said clock signal, for producing a carrier wave signal, including first reference register means for storing a predetermined upper limit and a predetermined lower limit of said carrier wave signal, first instantaneous register means for storing first data representative of the instantaneous value of the carrier wave signal, and incrementing means for increasing incrementally the first data stored in said first instantaneous register means when said first data is not less than said lower limit of the carrier wave signal and for decreasing incrementally said first data stored in said first instantaneous register means when said first data is not larger than said upper limit of said carrier wave signal;

auxiliary register means connected to said first register file means for receiving and storing said first data in said first instantaneous register means;

second register file means, periodically operating in response to said clock signal, for producing a pulse width modulation signal, including second reference register means for storing a plurality of second data values each of which represent a half period of a respective phase of a modulating wave based on the desired speed of the motor as determined by said computer, means for sequentially selecting said plurality of second data values from said second reference register means depending on the phase of the pulse width modulation signal to be produced, and means for comparing the selected second data values stored in the second reference register means and the value of the first data stored in said auxiliary register;

fundamental wave generator means responsive to said first register file means for generating a fundamental wave signal for each phase of the modulating wave; and means connected to said fundamental wave generator means and said second register file means for producing said pulse width modulation signal for each phase on the basis of said comparison between said selected second data values with said first data and said fundamental wave signal.

2. A motor control apparatus according to claim 1, wherein said means in said second register file means for sequentially selecting said plurality of second data values is connected to and contolled by said fundamental wave generator means.

3. A motor control apparatus according to claim 1, further including state section means connected to said first and second register file means for periodically transferring the contents of said first instantaneous register means to said incrementing means in said first register file means at a first frequency and for enabling said comparing means in said second register file means at a second frequency which is lower than said first frequency.

* * * * *